(12) United States Patent
Soohoo (10) Patent No.: US 9,631,914 B2
(45) Date of Patent: Apr. 25, 2017

(54) CALIBRATION OF SENSOR ARRAYS

(71) Applicant: The Boeing Company, Chicago, IL (US)

(72) Inventor: Kie L Soohoo, Tustin, CA (US)

(73) Assignee: The Boeing Company, Chicago, IL (US)

( * ) Notice: Subject to any disclaimer, the term of this patent is extended or adjusted under 35 U.S.C. 154(b) by 398 days.

(21) Appl. No.: 14/210,249

(22) Filed: Mar. 13, 2014

(65) Prior Publication Data

US 2015/0260498 A1    Sep. 17, 2015

(51) Int. Cl.
| | |
|---|---|
| G01B 21/00 | (2006.01) |
| G01B 5/004 | (2006.01) |
| G01S 17/87 | (2006.01) |
| G01S 7/40 | (2006.01) |
| G01S 7/497 | (2006.01) |
| G01S 7/52 | (2006.01) |
| G01S 13/87 | (2006.01) |
| G01S 15/87 | (2006.01) |

(52) U.S. Cl.
CPC ............... *G01B 5/004* (2013.01); *G01S 7/40* (2013.01); *G01S 7/497* (2013.01); *G01S 7/52004* (2013.01); *G01S 13/876* (2013.01); *G01S 15/876* (2013.01); *G01S 17/87* (2013.01)

(58) Field of Classification Search
CPC .......... G01B 5/02; G01B 7/023; G01B 11/02; G01B 11/026; G01B 21/042
See application file for complete search history.

(56) References Cited

U.S. PATENT DOCUMENTS

| | | | |
|---|---|---|---|
| 5,675,404 A * | 10/1997 | Nakazawa | ............... G01C 3/08 250/206.2 |
| 2005/0117454 A1* | 6/2005 | Millikin | ................... G01S 5/28 367/127 |
| 2006/0132357 A1 | 6/2006 | Pozgay et al. | |

\* cited by examiner

*Primary Examiner* — David Gray
*Assistant Examiner* — Andrew V Do
(74) *Attorney, Agent, or Firm* — Duft Bornsen & Fettig, LLP (57) ABSTRACT

Systems and methods for calibrating sensor arrays. An exemplary system measures a distance to a target object with the sensors. The system calculates a first position of the target object based on measurements from a first pair of the sensors and calibrated sensor coordinates for the first pair, calculates a second position of the target object based on measurements from a second pair of the sensors and the calibrated sensor coordinates for the second pair, and calculates a third position of the target object based on measurements from a third pair of the sensors and the calibrated sensor coordinates for the third pair. The system then compares the first position, the second position, and the third position calculated for the target object, and determines that the calibrated sensor coordinates for one or more of the sensors are inaccurate if a difference between the first, second, and third positions exceeds a threshold.

20 Claims, 4 Drawing Sheets

CALIBRATION OF SENSOR ARRAYS

GOVERNMENT LICENSE RIGHTS

This invention was made with United States Government (USG) support. The government has certain rights in the invention.

FIELD

This disclosure relates to the field of sensor arrays, and more particularly, to the calibration of sensor arrays.

BACKGROUND

There are a variety of applications where it is desirable to use a positioning system to determine the two-dimensional (2D) or three-dimensional (3D) position of a target object, such as manufacturing, assembly, construction, etc. A positioning system may use an array of sensors that measure or determine a distance to the target object. The positioning system then calculates the position (e.g., x,y or x,y,z) of the target object in a coordinate system based on the positions of the sensors, and the distance from the sensors to the target object.

Before a positioning system is used for measurements, the system is typically calibrated to determine the position (e.g., x,y,z) of the sensors in the array. Before calibration, the positions of the sensors are estimated using a tape measure, a laser measuring device, etc. After the sensor positions are estimated, an operator attempts to calibrate the sensor positions with hardware in the loop. This normally entails precisely surveying one or more target objects in the field of the sensor array. Each sensor then measures a distance to the target objects as a comparison to see how close the measurements are to the true surveyed distances. Adjustments may then be made to the estimated positions of the sensors using least squares, simplex, optimization algorithms, regression models, etc., to determine calibrated sensor positions. After calibration, the positioning system uses the calibrated sensor positions to determine the position of a target object in a coordinate system. If the calibrated sensor positions are not accurately determined during calibration, the measurements of the positioning system will likewise not be accurate.

Even though the calibrated sensor positions may be mathematically correct, it is difficult to determine if the calibrated sensor positions are actually correct so that a true position of the target object is provided. It would be desirable to verify that the calibrated sensor positions being used in the calculations are accurate.

SUMMARY

Embodiments described herein verify the accuracy of sensor positions that are determined during calibration of a positioning system. To verify the accuracy of sensor positions, measurements from different combinations of sensors in the array are processed to see if they yield common results. In a 2D scenario for example, measurements from different combinations of sensors are processed to determine a position of a target object. For instance, measurements from one pair of sensors are processed to determine a position $(x_1,y_1)$ of the target object. Also, measurements from another pair of sensors are processed to determine another position $(x_2,y_2)$ of the target object, and measurements from yet another pair of sensors are processed to determine yet another position $(x_3,y_3)$ of the target object. If the positions of the target object from the different pairs of sensors match within an acceptable threshold, then the positions of the sensors are verified as accurate. If the positions of the target object from the different pairs of sensors do not match within an acceptable threshold, then the sensor positions are not accurate and should be adjusted or recalibrated.

According to an embodiment, an apparatus includes a sensor array comprising at least three sensors each configured to measure a distance to a target object in a two-dimensional (2D) coordinate system, wherein calibrated sensor coordinates in the 2D coordinate system are determined for each of the sensors during calibration; and a controller configured to calculate a first position of the target object in the 2D coordinate system based on measurements from a first pair of the sensors and the calibrated sensor coordinates for the first pair of the sensors, to calculate a second position of the target object in the 2D coordinate system based on measurements from a second pair of the sensors and the calibrated sensor coordinates for the second pair of the sensors, and to calculate a third position of the target object in the 2D coordinate system based on measurements from a third pair of the sensors and the calibrated sensor coordinates for the third pair of the sensors, wherein the controller is configured to compare the first position, the second position, and the third position calculated for the target object, and to determine that the calibrated sensor coordinates are inaccurate if a difference between the first position, the second position, and the third position exceeds a threshold.

According to another embodiment, a method for calibrating a sensor array comprised of at least three sensors includes measuring a distance to a target object in a two-dimensional (2D) coordinate system with each of the sensors, wherein calibrated sensor coordinates in the 2D coordinate system are determined for each of the sensors during calibration; calculating a first position of the target object in the 2D coordinate system based on measurements from a first pair of the sensors and the calibrated sensor coordinates for the first pair of the sensors; calculating a second position of the target object in the 2D coordinate system based on measurements from a second pair of the sensors and the calibrated sensor coordinates for the second pair of the sensors; calculating a third position of the target object in the 2D coordinate system based on measurements from a third pair of the sensors and the calibrated sensor coordinates for the third pair of the sensors; comparing the first position, the second position, and the third position calculated for the target object; and determining that the calibrated sensor coordinates are inaccurate if a difference between the first position, the second position, and the third position exceeds a threshold.

According to yet another embodiment, an apparatus includes a sensor array comprising at least four sensors each configured to measure a distance to a target object in a three-dimensional (3D) coordinate system, wherein calibrated sensor coordinates in the 3D coordinate system are determined for each of the sensors during calibration; and a controller configured to calculate a first position of the target object in the 3D coordinate system based on measurements from a first set of the sensors and the calibrated sensor coordinates for the first set, to calculate a second position of the target object in the 3D coordinate system based on measurements from a second set of the sensors and the calibrated sensor coordinates for the second set, to calculate a third position of the target object in the 3D coordinate system based on measurements from a third set of the sensors and the calibrated sensor coordinates for the third set, and to calculate a fourth position of the target object in the 3D coordinate system based on measurements from a fourth set of the sensors and the calibrated sensor coordinates for the fourth set; the controller is configured to compare the first position, the second position, the third position, and the fourth position calculated for the target object, and to determine that the calibrated sensor coordinates are inaccurate if a difference between the first position, the second position, the third position, and the fourth position exceeds a threshold.

According to yet another embodiment, a method for calibrating a sensor array comprised of at least four sensors includes: measuring a distance to a target object in a three-dimensional (3D) coordinate system with each of the sensors, wherein calibrated sensor coordinates in the 3D coordinate system are determined for each of the sensors during calibration; calculating a first position of the target object in the 3D coordinate system based on measurements from a first set of the sensors and the calibrated sensor coordinates for the first set; calculating a second position of the target object in the 3D coordinate system based on measurements from a second set of the sensors and the calibrated sensor coordinates for the second set; calculating a third position of the target object in the 3D coordinate system based on measurements from a third set of the sensors and the calibrated sensor coordinates for the third set; calculating a fourth position of the target object in the 3D coordinate system based on measurements from a fourth set of the sensors and the calibrated sensor coordinates for the fourth set; comparing the first position, the second position, the third position, and the fourth position calculated for the target object; and determining that the calibrated sensor coordinates are inaccurate if a difference between the first position, the second position, the third position, and the fourth position exceeds a threshold.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
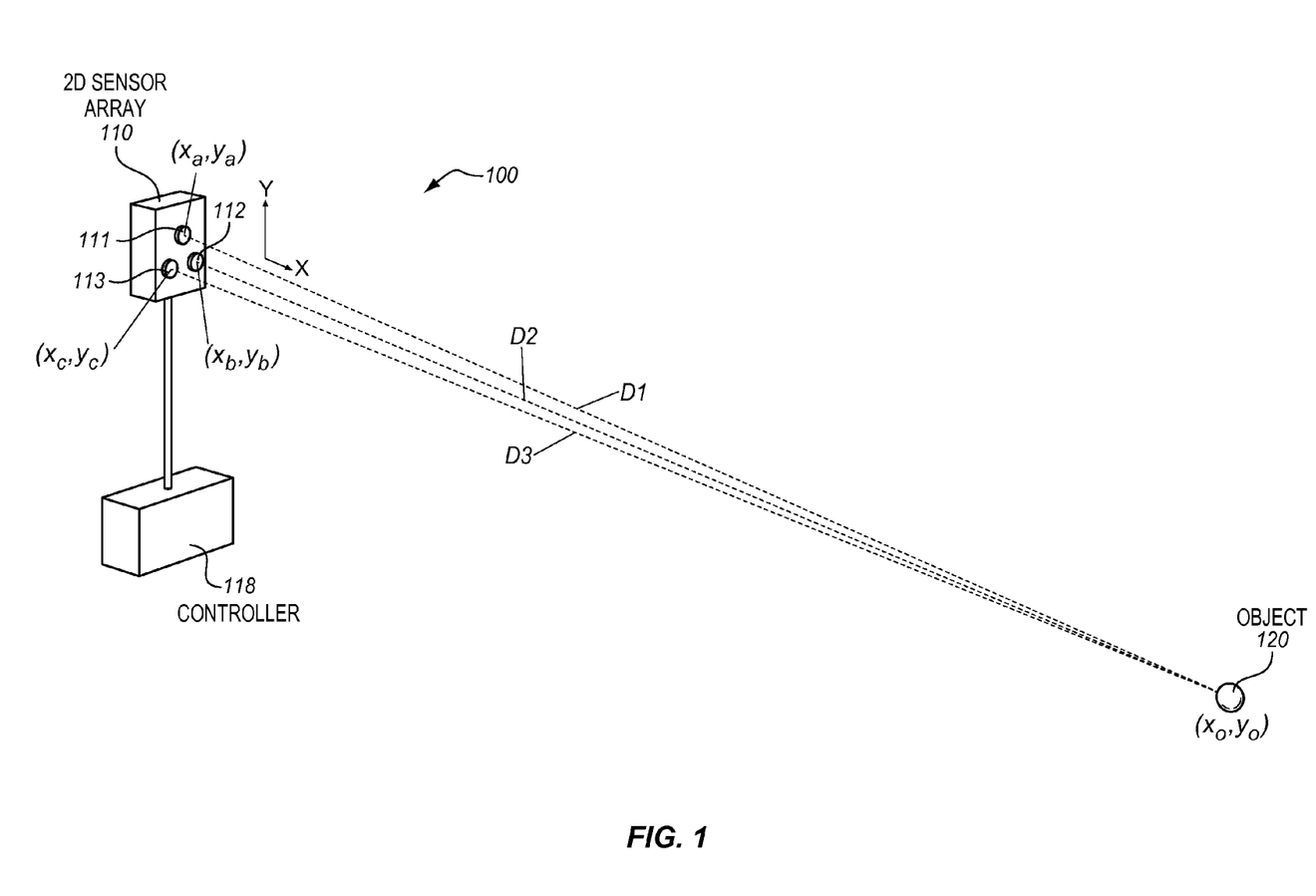
FIG. 1 illustrates a two-dimensional (2D) positioning system in an exemplary embodiment.

FIG. 1 illustrates a two-dimensional (2D) positioning system 100 in an exemplary embodiment. Positioning system 100 is configured to determine the position or location of one or more objects within a coordinate system. Positioning system 100 includes a 2D sensor array 110 having a plurality of sensors 111-113. Sensors 111-113 comprise any component or module configured to measure a distance or a range to a target object. Sensors 111-113 may comprise acoustic sensors, electromagnetic sensors, laser sensors, or any other type of ranging sensor that uses, for example, time of flight and time difference of arrival measurements. Sensors 111-113 may operate in a pulse-echo mode, or may receive a signal transmitted from an object. Although three sensors 111-113 are shown in FIG. 1, there may be more sensors in array 110.

Positioning system 100 also includes a controller 118 that is in communication with sensors 111-113. Controller 118 comprises any component or device that is able to process data from sensors 111-113 to determine a position or location of a target object within the coordinate system of the object. Controller 118 is connected to sensors 111-113 through some type of communication medium, such as a wired connection or wireless connection.

Before positioning system 100 is used to perform measurements on objects, such as target object 120, positioning system 100 is calibrated. Previously, a sensor array such as shown in FIG. 1 was calibrated by first estimating the positions of the sensors in a coordinate system. Then, one or more targets are precisely surveyed in the field of interest of the sensors. With the locations of the targets known, the sensors each measure a distance to the target(s) as a comparison to see how close the measurements are to the true surveyed distances. Adjustments may then be made to the estimated positions of the sensors using a mathematical technique, such as least squares, to determine a "calibrated" position of the sensors. After calibration, the position of an object could be determined based on the calibrated positions of the sensors, and distance measurements from these sensors.

With the prior calibration techniques, there was no way to verify the accuracy of the calibrated positions. Therefore, there was no effective way to ensure a positioning system was accurately calibrated. The embodiments provided herein describe calibrating and/or verifying the calibration of a positioning system. For positioning system 100, for example, sensors 111-113 are positioned with a clear line of sight to object 120 for calibration. Each sensor 111-113 is configured to measure a distance to object 120, such as using time of flight and time of arrival measurements (e.g., distance=time*speed). The position of each sensor 111-113 is estimated within the coordinate system during calibration. As shown in FIG. 1, sensor 111 has a position or coordinate $(x_a, y_a)$, sensor 112 has a position or coordinate $(x_b, y_b)$, and sensor 113 has a position or coordinate $(x_c, y_c)$. The coordinates $(x_a, y_a)$, $(x_b, y_b)$, and $(x_c, y_c)$ are referred to as "calibrated sensor coordinates", as they represent the positions of sensors 111-113 determined as a part of calibration. In this example, the coordinate system used in FIG. 1 is a Cartesian coordinate system, and the positions of sensors 111-113 and object 120 are shown as (x,y) coordinates. This type of coordinate system is just an example, and other types of coordinate systems may be implemented, such as polar coordinates (range, bearing).

Figure 2:
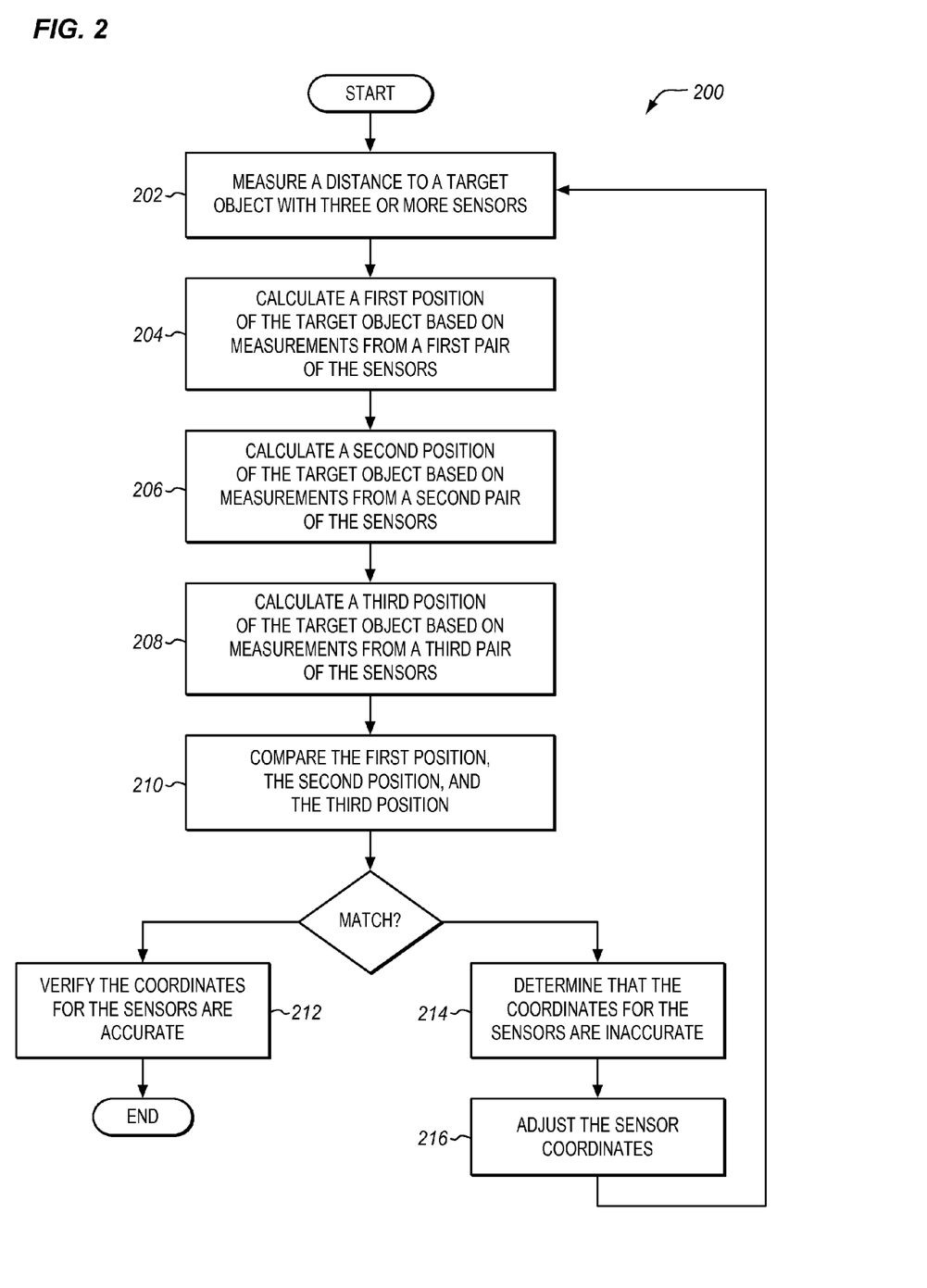
FIG. 2 is a flow chart illustrating a method for calibrating a 2D-sensor array in an exemplary embodiment.

FIG. 2 is a flow chart illustrating a method 200 for calibrating a 2D-sensor array 110 in an exemplary embodiment. The steps of method 200 will be described with respect to positioning system 100 of FIG. 1, although one skilled in the art will understand that the methods described herein may be performed by other devices or systems not shown. The steps of the methods described herein are not all inclusive and may include other steps not shown. The steps for the flow charts shown herein may also be performed in an alternative order.

In step 202, each sensor 111-113 measures a distance to object 120. As shown in FIG. 1, sensor 111 may measure a distance D1, sensor 112 may measure a distance D2, and sensor 113 may measure a distance D3. Sensors 111-113 then provide signals or data to controller 118 which represents the distance measurements.

Controller 118 processes data from pairs of sensors 111-113 to determine positions (i.e., coordinates) for object 120 in the coordinate system. The 2D position of object 120 has two unknowns $(x_0, y_0)$ that can be solved with measurements from two of the sensors 111-113. When there are three sensors as in FIG. 1, the two unknowns $(x_0, y_0)$ can be solved with measurements from three different combinations of two sensors. For instance, controller 118 calculates or determines a first position $(x_1, y_1)$ of object 120 based on measurements from a first pair (i.e., two) of sensors (e.g., sensors 111-112), in step 204. The first position $(x_1, y_1)$ is an estimated position $(x_0, y_0)$ of object 120 based on measurements from the first pair of sensors, and the calibrated sensor coordinates for the first pair of sensors. Controller 118 also calculates a second position $(x_2, y_2)$ of object 120 based on measurements from a second pair of sensors (e.g., sensors 112-113), in step 206. The second position $(x_2, y_2)$ is an estimated position $(x_0, y_0)$ of object 120 based on measurements from the second pair of sensors, and the calibrated sensor coordinates for the second pair of sensors. Controller 118 also calculates a third position $(x_3, y_3)$ of object 120 based on measurements from a third pair of sensors (e.g., sensors 111 and 113), in step 208. The third position $(x_3, y_3)$ is an estimated position $(x_0, y_0)$ of object 120 based on measurements from the third pair of sensors, and the calibrated sensor coordinates for the third pair of sensors.

The equation used to determine the estimated positions of object 120 from pairs of sensors takes into account the distance measurements from sensors 111-113, and the position of sensors 111-113 in the coordinate system. An exemplary matrix equation which may be used is a follows:

$AX=B$, where $A$ is the matrix of the sensor positions (i.e., calibrated sensor coordinates), $X$ is the estimated position $(x_0, y_0)$ of object 120, and $B$ is a function of the distance measurements for the sensors. (1)

The calibrated sensor coordinates for sensors 111-113 are validated when controller 118 calculates the same position for object 120 based on measurements from the different pairs of sensors. Thus, controller 118 compares the positions determined for object 120 in step 210. For example, controller 118 may compare the different estimated positions $(x_1, y_1)$, $(x_2, y_2)$, and $(x_3, y_3)$ for object 120 with one another to see if they match within an acceptable threshold (within the noise error). In other words, controller 118 determines if the difference between the estimated positions exceeds the acceptable threshold. If the estimated coordinates match within the threshold (i.e., the difference does not exceed the threshold), then controller 118 verifies that the calibrated sensor coordinates for sensors 111-113 are accurate in step 212. This means that positioning system 100 has been calibrated to provide precise position measurements for objects. Controller 118 may also provide some type of indication to an operator verifying the calibration of positioning system 100.

If the estimated positions for object 120 do not match within the threshold (i.e., the difference does exceed the threshold), then controller 118 determines that the calibrated sensor coordinates for sensors 111-113 are inaccurate in step 214. If the calibrated sensor coordinates for sensors 111-113 are not accurate, then controller 118 may adjust the calibrated sensor coordinates for one or more of the sensors in step 216, and repeat the process of FIG. 2. This may be an iterative process, where controller 118 adjusts the calibrated sensor coordinates for one or more of sensors 111-113 using advanced mathematics, such as steepest descent, non-linear optimization, simplex, etc., to iteratively converge on a corrected set of sensor coordinates. Method 200 may then repeat with the corrected sensor coordinates. Method 200 may repeat multiple times until controller 118 determines a correct set of sensor coordinates has been found, which may be used to provide accurate measurements.

Because method 200 may be used to adjust the calibrated sensor coordinates until they are accurate, an operator does not have to go through the process of precisely surveying target(s) in the field of interest of the sensor array, and then determine calibrated sensor coordinates for the sensors based on the surveyed positions of the target(s). In the embodiments described herein, a rough estimate of sensor coordinates may be initially used. Method 200 may then be used to verify the accuracy of the sensor coordinates. If the sensor coordinates are not accurate, then they are adjusted and method 200 is repeated with the adjusted sensor coordinates until they are optimized. This is advantageous because positioning system 100 is able to calibrate itself based on measurements from sensors 111-113, and precise surveying is not needed. Also, during real-time measurements, an operator can view the estimated positions $(x_0, y_0)$ for an object from the different pairs of sensors, and verify that the position measurement $(x_0, y_0)$ for the object and the calibrated sensor coordinates are accurate for the measurements.

Figure 3:
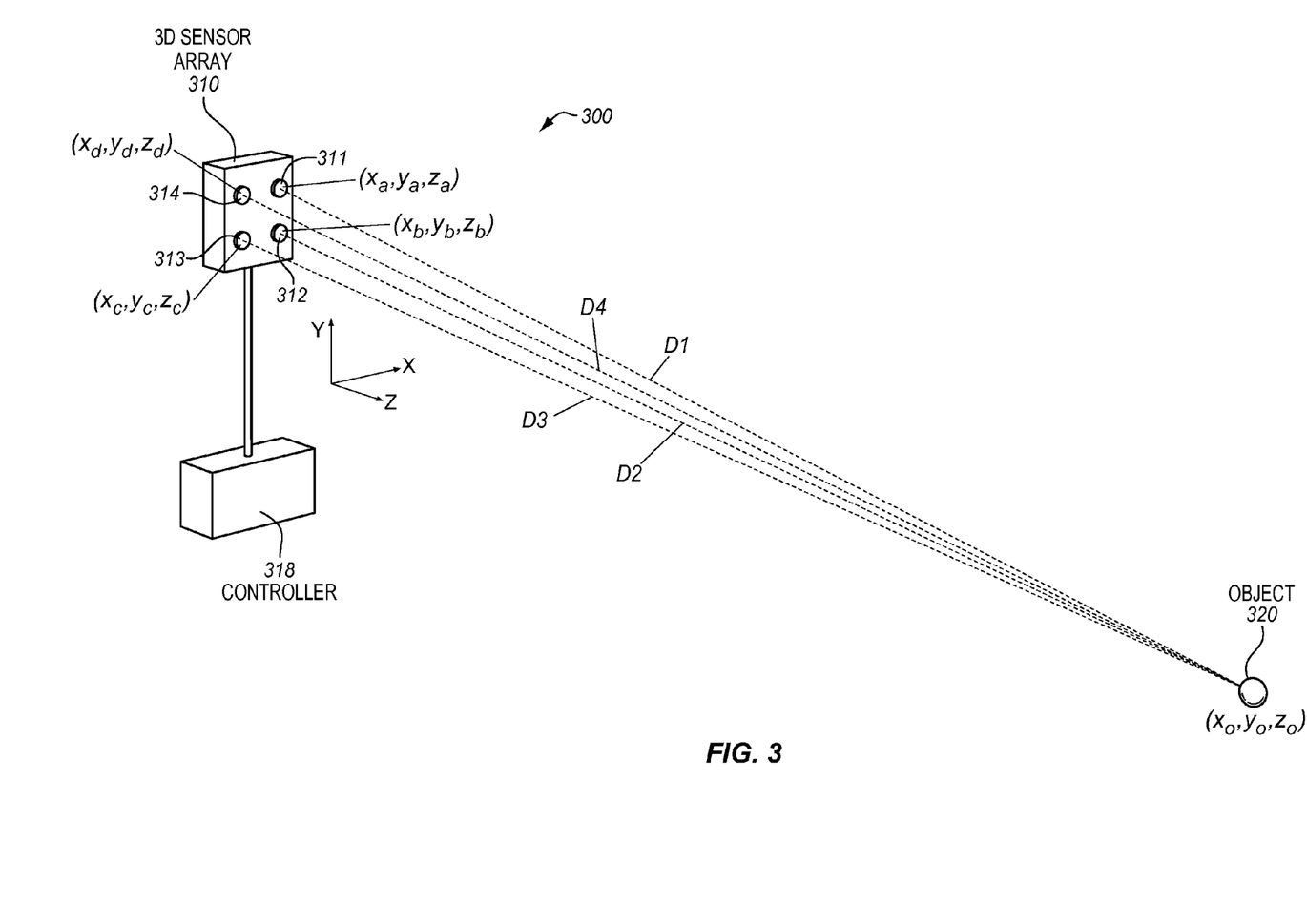
FIG. 3 illustrates a three-dimensional (3D) positioning system in an exemplary embodiment.

A similar type of calibration can be used for a 3D positioning system. FIG. 3 illustrates a three-dimensional (3D) positioning system 300 in an exemplary embodiment. Positioning system 300 is configured to determine the position or location of a target object within a 3D coordinate system. Positioning system 300 includes a 3D sensor array 310 having a plurality of sensors 311-314. Although four sensors 311-314 are shown in FIG. 3, there may be more sensors in array 310. Positioning system 300 also includes a controller 318 that is in communication with sensors 311-314.

Before positioning system 300 is used to perform measurements on objects, such as target object 320, positioning system 300 is calibrated. For positioning system 300, for example, sensors 311-314 are positioned with a clear line of sight to object 320 for calibration. Each sensor 311-314 is configured to measure a distance to object 320. The position of each sensor 311-314 is estimated within the coordinate system during calibration. As shown in FIG. 3, sensor 311 has a position of $(x_a, y_a, z_a)$, sensor 312 has a position of $(x_b, y_b, z_b)$, sensor 313 has a position of $(x_c, y_c, z_c)$, and sensor 314 has a position of $(x_d, y_d, z_d)$. The coordinates $(x_a, y_a, z_a)$, $(x_b, y_b, z_b)$, $(x_c, y_c, z_c)$, and $(x_d, y_d, z_d)$ are referred to as "calibrated sensor coordinates". In this example, the coordinate system used in FIG. 3 is a Cartesian coordinate system, and the positions of sensors 311-314 and object 320 are shown as (x,y,z) coordinates. This type of coordinate system is just an example, and other types of coordinate systems may be implemented, such as polar coordinates.

Figure 4:
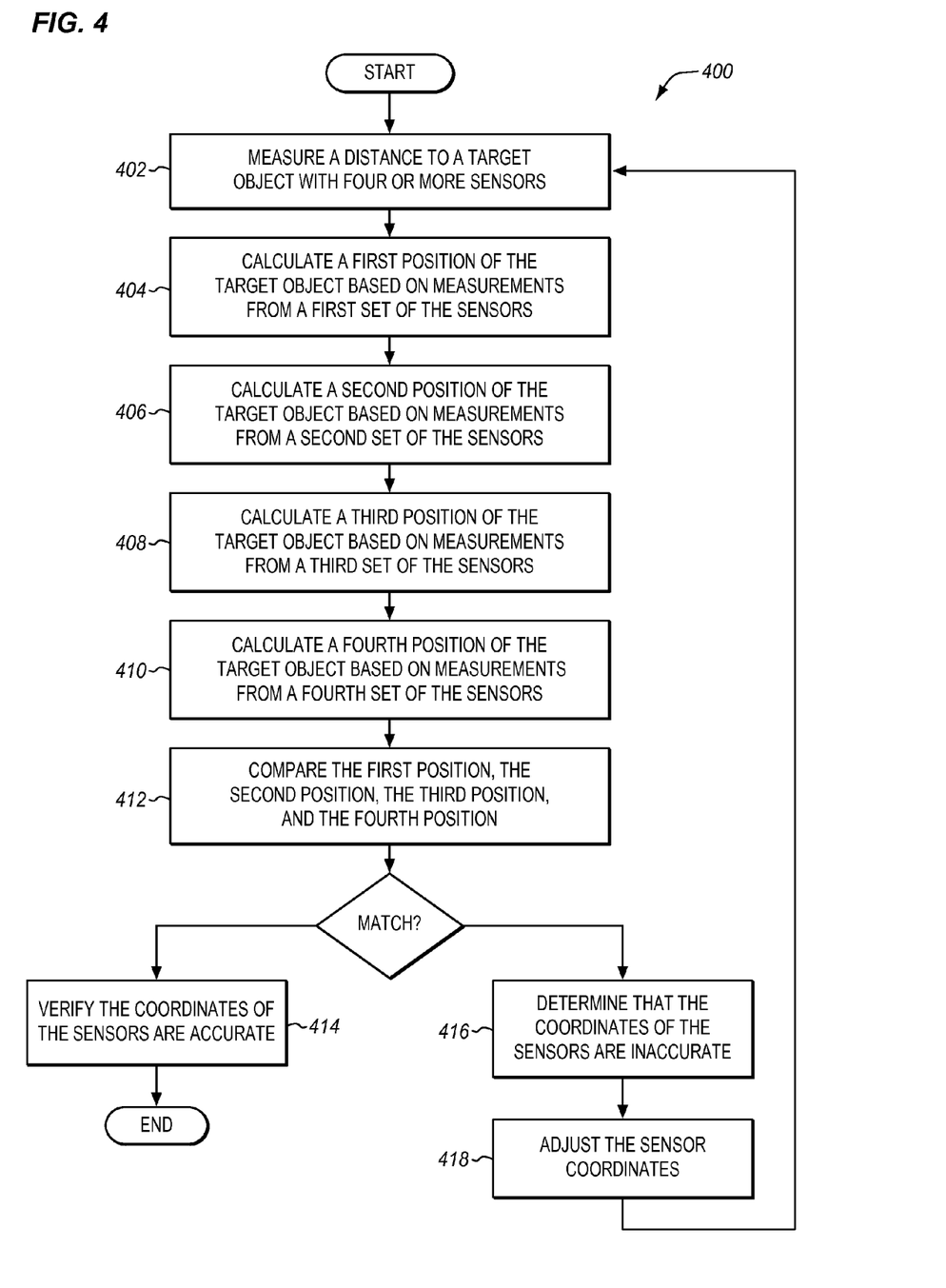
FIG. 4 is a flow chart illustrating a method for calibrating a 3D-sensor array in an exemplary embodiment.

FIG. 4 is a flow chart illustrating a method 400 for calibrating a 3D-sensor array 310 in an exemplary embodiment. The steps of method 400 will be described with respect to positioning system 300 of FIG. 3, although one skilled in the art will understand that the methods described herein may be performed by other devices or systems not shown.

In step 402, each sensor 311-314 measures a distance to object 320. As shown in FIG. 3, sensor 311 may measure a distance D1, sensor 312 may measure a distance D2, sensor 313 may measure a distance D3, and sensor 314 may measure a distance D4. Sensors 311-314 then provide signals or data to controller 318 which represents the distance measurements.

Controller 318 processes the data from different sets of (three) sensors 311-314 to determine different positions (i.e., coordinates) for object 320 in the coordinate system. The 3D position of object 320 has three unknowns ($x_0,y_0,z_0$) that can be solved with measurements from three sensors. When there are four sensors as in FIG. 3, the three unknowns ($x_0,y_0,z_0$) can be solved with measurements from four different combinations of three of the sensors 311-314. For instance, controller 318 calculates or determines a first position ($x_1,y_1,z_1$) of object 320 based on measurements from a first set of three sensors (e.g., sensors 311, 312, and 313), in step 404. The first position ($x_1,y_1,z_1$) is an estimated position ($x_0,y_0,z_0$) of object 320 based on measurements from the first set of three sensors, and the calibrated sensor coordinates for the first set of three sensors. Controller 318 also calculates a second position ($x_2,y_2,z_2$) of object 320 based on measurements from a second set of three sensors (e.g., sensors 311, 313, and 314), in step 406. The second position ($x_2,y_2,z_2$) is an estimated position ($x_0,y_0,z_0$) of object 320 based on measurements from the second set of three sensors, and the calibrated sensor coordinates for the second set of three sensors. Controller 318 also calculates a third position ($x_3,y_3,z_3$) of object 320 based on measurements from a third set of three sensors (e.g., sensors 312, 313, and 314), in step 408. The third position ($x_3,y_3,z_3$) is an estimated position ($x_0,y_0,z_0$) of object 320 based on measurements from the third set of three sensors, and the calibrated sensor coordinates for the third set of three sensors. Controller 318 also calculates a fourth position ($x_4,y_4,z_4$) of object 320 based on measurements from a fourth set of three sensors (e.g., sensors 311, 312, and 314), in step 410. The fourth position ($x_4,y_4,z_4$) is an estimated position ($x_0,y_0,z_0$) of object 320 based on measurements from the fourth set of three sensors, and the calibrated sensor coordinates for the fourth set of three sensors.

The calibrated sensor coordinates are validated when controller 318 calculates the same position for object 320 based on measurements from the different sets of three sensors. Therefore, controller 318 compares the sets of coordinates (e.g., the first set, the second set, the third set, and the fourth set) determined for object 320 in step 412. For example, controller 318 may compare the different estimated positions ($x_1,y_1,z_1$), ($x_2,y_2,z_2$), ($x_3,y_3,z_3$), and ($x_4,y_4,z_4$) for object 320 with one another to see if they match within an acceptable threshold (within the noise error). If the estimated positions for object 320 match within the threshold, then controller 318 verifies that the calibrated sensor coordinates are accurate in step 414. This means that positioning system 300 has been calibrated to provide precise position measurements for objects. Controller 318 may also provide some type of indication to an operator verifying the calibration of positioning system 300.

If the estimated positions for object 320 do not match within the threshold, then controller 318 determines that the calibrated sensor coordinates are inaccurate in step 416. If the calibrated sensor coordinates are not accurate, then controller 318 may adjust the calibrated sensor coordinates for one or more sensors in step 418, and repeat the process of FIG. 4. This may be an iterative process, where controller 318 adjusts the calibrated sensor coordinates for one or more of sensors 311-314 using advanced mathematics, such as steepest descent, non-linear optimization, simplex, etc., to iteratively converge on a corrected set of sensor coordinates. Method 400 may then repeat with the corrected sensor coordinates. Method 400 may repeat multiple times until controller 318 determines a correct set of sensor coordinates have been found, which may be used to provide accurate measurements.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
a sensor array comprising at least three sensors each configured to measure a distance to a target object in a two-dimensional (2D) coordinate system, wherein calibrated sensor coordinates in the 2D coordinate system are determined for each of the sensors during calibration; and
a controller configured to calculate a first position of the target object in the 2D coordinate system based on measurements from a first pair of the sensors and the calibrated sensor coordinates for the first pair of the sensors, to calculate a second position of the target object in the 2D coordinate system based on measurements from a second pair of the sensors and the calibrated sensor coordinates for the second pair of the sensors, and to calculate a third position of the target object in the 2D coordinate system based on measurements from a third pair of the sensors and the calibrated sensor coordinates for the third pair of the sensors, wherein the controller is configured to compare the first position, the second position, and the third position calculated for the target object, and to determine that the calibrated sensor coordinates are inaccurate if a difference between the first position, the second position, and the third position exceeds a threshold.

2. The apparatus of claim 1 wherein:
the controller is configured to adjust the calibrated sensor coordinates for at least one sensor responsive to a determination that the calibrated sensor coordinates are inaccurate.

3. The apparatus of claim 1 wherein:
the controller is configured to verify the calibrated sensor coordinates are accurate if the difference between the first position, the second position, and the third position does not exceed the threshold.

4. The apparatus of claim 3 wherein:
the controller is configured to provide an indication to an operator if the calibrated sensor coordinates for the sensors are verified as accurate.

5. The apparatus of claim 1 wherein:
the sensors comprise acoustic sensors.

6. A method for calibrating a sensor array comprised of at least three sensors, the method comprising:
measuring a distance to a target object in a two-dimensional (2D) coordinate system with each of the sensors, wherein calibrated sensor coordinates in the 2D coordinate system are determined for each of the sensors during calibration;
calculating a first position of the target object in the 2D coordinate system based on measurements from a first pair of the sensors and the calibrated sensor coordinates for the first pair of the sensors;
calculating a second position of the target object in the 2D coordinate system based on measurements from a second pair of the sensors and the calibrated sensor coordinates for the second pair of the sensors;
calculating a third position of the target object in the 2D coordinate system based on measurements from a third pair of the sensors and the calibrated sensor coordinates for the third pair of the sensors;
comparing the first position, the second position, and the third position calculated for the target object; and
determining that the calibrated sensor coordinates are inaccurate if a difference between the first position, the second position, and the third position exceeds a threshold.

7. The method of claim 6 further comprising:
adjusting the calibrated sensor coordinates for at least one sensor responsive to a determination that the calibrated sensor coordinates are inaccurate.

8. The method of claim 6 further comprising:
verifying the calibrated sensor coordinates are accurate if the difference between the first position, the second position, and the third position does not exceed the threshold.

9. The method of claim 8 further comprising:
providing an indication to an operator if the calibrated sensor coordinates are verified as accurate.

10. The method of claim 6 wherein:
the sensors comprise acoustic sensors.

11. An apparatus comprising:
a sensor array comprising at least four sensors each configured to measure a distance to a target object in a three-dimensional (3D) coordinate system, wherein calibrated sensor coordinates in the 3D coordinate system are determined for each of the sensors during calibration; and
a controller configured to calculate a first position of the target object in the 3D coordinate system based on measurements from a first set of the sensors and the calibrated sensor coordinates for the first set, to calculate a second position of the target object in the 3D coordinate system based on measurements from a second set of the sensors and the calibrated sensor coordinates for the second set, to calculate a third position of the target object in the 3D coordinate system based on measurements from a third set of the sensors and the calibrated sensor coordinates for the third set, and to calculate a fourth position of the target object in the 3D coordinate system based on measurements from a fourth set of the sensors and the calibrated sensor coordinates for the fourth set;

wherein the controller is configured to compare the first position, the second position, the third position, and the fourth position calculated for the target object, and to determine that the calibrated sensor coordinates are inaccurate if a difference between the first position, the second position, the third position, and the fourth position exceeds a threshold.

12. The apparatus of claim 11 wherein:
the controller is configured to adjust the calibrated sensor coordinates for at least one sensor responsive to a determination that the calibrated sensor coordinates are inaccurate.

13. The apparatus of claim 11 wherein:
the controller is configured to verify the calibrated sensor coordinates are accurate if the difference between the first position, the second position, the third position, and the fourth position does not exceed the threshold.

14. The apparatus of claim 13 wherein:
the controller is configured to provide an indication to an operator if the calibrated sensor coordinates are verified as accurate.

15. The apparatus of claim 11 wherein:
the sensors comprise acoustic sensors.

16. A method for calibrating a sensor array comprised of at least four sensors, the method comprising:
measuring a distance to a target object in a three-dimensional (3D) coordinate system with each of the sensors, wherein calibrated sensor coordinates in the 3D coordinate system are determined for each of the sensors during calibration;
calculating a first position of the target object in the 3D coordinate system based on measurements from a first set of the sensors and the calibrated sensor coordinates for the first set;
calculating a second position of the target object in the 3D coordinate system based on measurements from a second set of the sensors and the calibrated sensor coordinates for the second set;
calculating a third position of the target object in the 3D coordinate system based on measurements from a third set of the sensors and the calibrated sensor coordinates for the third set;

calculating a fourth position of the target object in the 3D coordinate system based on measurements from a fourth set of the sensors and the calibrated sensor coordinates for the fourth set;

comparing the first position, the second position, the third position, and the fourth position calculated for the target object; and determining that the calibrated sensor coordinates are inaccurate if a difference between the first position, the second position, the third position, and the fourth position exceeds a threshold.

17. The method of claim 16 further comprising:

adjusting the calibrated sensor coordinates for at least one sensor responsive to a determination that the calibrated sensor coordinates are inaccurate.

18. The method of claim 16 further comprising:

verifying the calibrated sensor coordinates are accurate if the difference between the first position, the second position, the third position, and the fourth position does not exceed the threshold.

19. The method of claim 18 further comprising:

providing an indication to an operator if the calibrated sensor coordinates are verified as accurate.

20. The method of claim 16 wherein:

the sensors comprise acoustic sensors.

* * * * *